Figure 2:
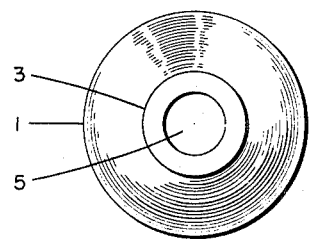

Aug. 3, 1965  W. D. KIRKLAND ETAL  3,198,368
CONTAINER CLOSURE
Filed July 24, 1963

Inventors: W. Dean Kirkland
Jim T. Oba

Agent: Paul D. Burgauer 3,198,368
CONTAINER CLOSURE
Walter Dean Kirkland, Libertyville, and Jim T. Oda, Mundelein, Ill., assignors to Abbott Laboratories, North Chicago, Ill., a corporation of Illinois
Filed July 24, 1963, Ser. No. 298,524
1 Claim. (Cl. 215—37)

The present invention is directed to a new sealing member for solution containers. More particularly, it is concerned with a closure means for containers allowing multiple needle punctures which is a requirement for closures on vials storing injectable medicinal (parenteral) solutions.

For many years, the conventional sealing member or stopper used for containers storing injectable solutions has been made from vulcanized, natural rubber. Such sealing members or stoppers have the advantages of providing an excellent seal with the container neck or rim and of being elastic enough that where the needle of a syringe is inserted, the puncture made thereby reseals after withdrawal of the needle. However, sealing members made from natural rubber have distinct disadvantages which have been recognized for many years, but no acceptable solution has heretofore been offered: they permit the loss of certain chemicals through absorption and/or evaporation. Scientists, so far, have not been able to prevent such losses, although numerous suggestions have been made and tried, e.g., a saturation technique described by Royce and Sykes in Journal of Pharmacy and Pharmacology, volume 9, pages 814 ff. (1957). From this and similar publications it is apparent that saturating or balancing the conventional rubber closure with a particular chemical is only a temporary answer to the problem and furthermore requires that for each solution the appropriately saturated closure member has to be treated individually. Other authors have suggested complete replacement of the natural rubber by other elastomeric or elastic materials such as neoprene, butyl or nitrile rubber but it has been found that natural rubber has by far the best resealability for needle-punctures. Various linings have also been suggested for natural rubber closures but these linings either impair the sealing capacity of the natural rubber to the container opening or they are not chemically inert. Of all the modified rubber products and elastomers tried and tested in the past for preventing losses from the bottle content, none has matched the sealing and resealing quality of natural rubber.

It is therefore an object of the present invention to seal a container for liquids with a closure member which has the characteristic of resealing a hole punctured therein by a conventional hypodermic needle and which prevents the loss of chemicals stored in said container. It is another object of the present invention to provide a resealing closure means that will not absorb chemicals ordinarily present in medicinal solutions, and which will not react with such solutions.

These and other objects are accomplished by the provision of a container comprising a storage vessel with a defined access opening and a closure means sealably closing said opening, said closure means comprising a first layer of chlorobutyl rubber or a tetrafluoroethylene polymer adjacent said opening and a second layer of natural rubber in superposed relation to said first layer. The term "tetrafluoroethylene polymer" used herein is to be understood as relating primarily to Teflon® [Du Pont's poly(tetrafluoroethylene)] but also includes similar solid but at least partially elastic polymers and copolymers made from tetrafluoroethylene in which the latter forms at least 75% of the repeating units. The term "chlorobutyl rubber" as used throughout this specification refers to the elastomers described in U.S. Patent No. 2,944,578 and particularly to Enjay Butyl HT®.

The closure member of the present invention may have the shape of a disk that fits sealably over the flange of a glass container such as used for liquid chemicals or pharmaceutical solutions or it may be in the form of a plug; it may also be a combination of two forms specifically mentioned, i.e., a disk which sealably fits over the flange of a container and a plug-type protrusion which fits the inner contours of the container neck and comprises a thin, needle-pierceable center section. Whatever over-all shape is selected, the sealing member of the present invention is to be constructed in such a manner that the natural rubber is lined with the chlorobutyl or tetrafluoroethylene polymer where it would normally come in contact with the chemicals in said container. The term "lining" referred to herein is thus to be understood in its well-defined meaning.

In the most common embodiment, the container described herein is a bottle such as shown in the attached drawing.

Figure 1:
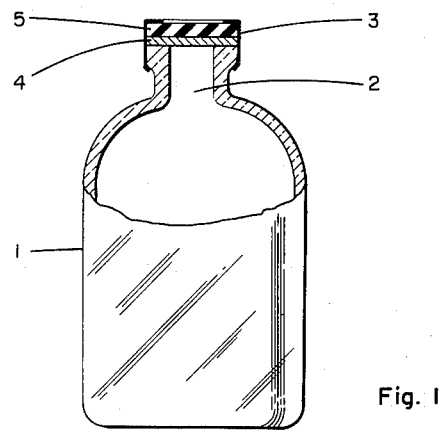

FIGURE 1 is a front view of such a bottle, cross-sectioned in the upper portion, and FIGURE 2 is the top view of said bottle.

In these figures, a bottle 1 with access opening 2 is covered by a rubber laminate. This laminate comprises a layer 4 immediately adjacent to said opening made from chlorobutyl rubber or polymer of tetrafluoroethylene which is backed by a second layer 5 immediately adjacent to said first layer 4 but made from natural rubber. The closure disk consisting of layers 4 and 5 is held in place in order to produce an air-tight seal by overseal 3 which is a customary metal sealing ring.

The closure member of the present invention combines a number of required characteristics with advantages not obtainable by any other closure means known to date: a puncture made by a hypodermic needle will reseal immediately upon withdrawal of the needle; the content of the container only comes in contact with the lining, that is, the tetrafluoroethylene polymer or the chlorobutyl rubber, and substantially no loss of the container content occurs; the container is completely sealed when the above closure member is pressed into close contact with the container opening (neck or flange) for which it is designed. In most assemblies, however, a metal sealing ring is positioned over the periphery of the closure member to insure tight contact between that member and the container opening.

The chlorobutyl rubber lining of the closure means of the present invention may, if desired, be a separate layer, in contact with but unbonded to the natural rubber layer when the closure means is of the disk type ordinarily used for pharmaceutical vials. In all other instances, it is preferred that the lining be bonded to and form a unitary structure with the natural rubber backing. The bonding can be done in any of the numerous conventional ways known to those skilled in the art, e.g., the two layers may be co-vulcanized into a unitary structure or they may be adhered to one another by an adhesive.

When tetrafluoroethylene polymer is used as the lining of the present closure member, the thickness thereof is best chosen within the range of from about 2 mils to about 5 mils. Below about 2 mils, some handling difficulties may arise, and if that dimension is increased to about above 5 mils, no additional advantage is gained but additional costs are incurred. When the lining is selected to be chlorobutyl rubber, there is no particular requirement for its thickness; excellent results are obtained when the chlorobutyl lining has a thickness of between 20 mils and 40 mils. In any case, however, the combined thickness of lining and backing should be between 60 mils and 100 mils. Ordinarily, the backing or natural rubber layer is preferably at least 40 mils thick but may be as thick as 98 mils (in the case of a 2-mil disk of poly(tetrafluoroethylene). Below this limit, the resealing capacity of the closure may be less reliable and above said limit it may become too difficult to insert a needle through the closure to withdraw some of the liquid stored in the container. Obviously, where the closure means of the present invention is of the plug or stopper type, the above given upper limit for the total thickness refers only to that section which will be pierced by a hypodermic needle when a portion of the container content is withdrawn. For the disk-type closure member it obviously will be most practical to have uniform thickness of the two layers throughout the disk.

It will be understood that the container referred to in the present specification may have any one of a multitude of shapes and that it may be made of a variety of materials. The most commonly used containers for storing multi-dose injectable solutions are made of glass, but it will be appreciated that glass is not required. The container may be constructed of other rigid materials, e.g., metal glass-lined metal, polystyrene, etc. or it can be a semi-rigid or even a flexible material, e.g., polyethylene, polypropylene and the like. Where the container is semi-rigid or flexible, it is, however, required that the access opening be rigid or semi-rigid so that a reliable seal can be provided between said access opening and the closure member.

To show the effect of the present invention, reference is made to the following examples which are given here as demonstration of utility and which are not intended to limit the invention in any respect.

EXAMPLE 1

A solution of 9 grams of benzyl alcohol in 1000 ml. of water was prepared and the four types of closed containers described below were filled with this solution.

(A) A glass ampule of 10-ml. content.

(B) A 30-ml. glass vial sealably closed with a natural rubber stopper.

(C) A 2-ml. glass vial sealably closed with a natural rubber stopper.

(D) A 2-ml. glass vial sealably closed with (a) a Teflon poly(tetrafluoroethylene) disk of 5 mils thickness and (b) a natural rubber backing disk of 75 mils thickness. The two disks were not bonded to one another; the poly(tetrafluoroethylene) disk was first placed over the container opening so that the natural rubber disk acted as a backing therefor.

A number of each of these containers were stored at 50° C. for an extended period of time and the strength of the benzyl alcohol solution was analyzed after a specified time. In tests with containers C and D, the content of three vials was pooled for analysis. In all tests, fresh containers were used for each time period and the initial strength of the solution was adjusted to 100%. The analytical results are listed in Table 1.

Table 1

| Time | A | B | C | D |
|---|---|---|---|---|
| | Percent | Percent | Percent | Percent |
| 1 month | 97 | 95 | 67 | 97 |
| 2 months | 97 | 92 | 44 | 97 |
| 3 months | 96 | 91 | 79(25°) | 96 |
| 4½ months | 93 | 88 | 75(25°) | 101 |
| 7 months | 97 | 81 | | 96 |
| 15 months | 98 | | | 97 |

It will be seen from the above example that the combination sealing member of the present invention (column D) produces excellent results, comparable only with the results obtained in a completely closed container (glass ampule, column A), while the ordinarily used natural rubber stopper shows serious losses of benzyl alcohol.

EXAMPLE 2

In this example, a 2-ml. vial containing the solution of Example 1 was used and the opening of the container was sealably closed with a 5-mils-thick Teflon poly(tetrafluoroethylene) disk backed by a natural rubber disk of 75-mil thickness, but the disks in this case were bonded together into a unitary structure by conventional techniques. The vials, stored for several months at 50° C. showed the results listed in Table 2 (original strength of solution adjusted to 100%.)

Table 2

| Time: | Retention, percent |
|---|---|
| 1 month | 99 |
| 2 months | 100 |
| 3 months | 101 |
| 4 months | 101 |
| 6 months | |

EXAMPLE 3

A number of 2-ml. vials, each filled with the solution of Example 1 and closed with a natural rubber stopper of 35 mils thickness which was lined with a 35-mils-thick layer of Enjay Butyl HT (a chlorinated butyl rubber described in U.S. 2,944,578) were used for the evaporation studies. Again, only the lining was exposed to the vial content. The two layers of the uniformly thick components were co-vlucanized to form a unitary structure well fitting and sealing to the flange of the vials. The vials were stored for extended times at 60° C. The initial solution was adjusted to a strength of 100% and Table 3 shows the strengths of the solutions after several months.

Table 3

| Time: | Retention, Percent |
|---|---|
| ½ month | 102 |
| 1 month | 103 |
| 2 months | 100 |
| 4 months | 98 |
| 6 months | 96 |
| 9 months | 96 |

It will be seen from the foregoing examples that the closure means of the present invention substantially prevents the loss of benzyl alcohol used commonly as a preservative in liquid pharmaceutical preparations even at elevated temperatures. Though the above examples all refer to a specific preservative, it is to be undrestood that benzyl alcohol is not the only compound the loss of which is prevented by the present closure means. It has also been established by similar experiments that other commonly used preservatives which dissipate through ordinary natural rubber closures, e.g., phenol, cresols, methyl p-hydroxybenzoate, propyl p-hydroxybenzoate, sodium benzoate, chlorobutanol, mercurials, quaternary ammonium salts, and the like, were similarly well retained in the container to which this invention pertains.

The prevention of the commonly experienced losses of preservatives in storage of pharmaceutical solutions is, of course, of paramount importance. Where in the past an injectable solution containing a preservative had to be discarded after 6–12 months of storage, solutions stored with the closure of the present invention are still useable. In the past, only ampules assured preservation but, of course, ampules will not permit the storage of multiple doses. Thus, the present closure means serves the dual purpose of permitting much longer storing times for pharmaceutical solutions and the withdrawal of part of the stored solution without sacrificing the remainder of the solution.

The relatively thin layer of chlorobutyl rubber used as lining for the natural rubber closure does not change the physical properties of such a closure significantly from that of natural rubber closures. Thus, the new closure means is still easily pierceable by a metal needle, it still produces a perfect seal with the container opening for which it is shaped, and it still has the required resealability necessary for containers of parenteral solutions designed for more than a single use. This is in addition to the prevention of losses of preservatives usually incorporated in such solutions, a feature heretofore not achieved for multi-dose containers. The chlorobutyl rubber used as the lining for the natural rubber for the closure means of this invention is further unique in being chemically substantially inert yet easily bondable to natural rubber by conventional techniques. The two layers may even be co-vulcanized, a characteristic which is of particular importance where a laminate of this type is to be manufactured in sheet form and disks of the desired diameter are to be cut out from the laminated sheet to fit the opening of the multi-dose vial.

Others may practice the invention in any of the numerous ways which will be suggested to one skilled in the art by the present disclosure. All such practice of the invention is considered to be a part hereof provided it falls within the scope of the appended claim.

We claim:

A container for parenteral solutions comprising a storage vessel with a defined access opening and a closure means, said closure means comprising a lining capable of sealably closing said opening of said container and a resealable backing of natural rubber which is easily pierceable by a hypodermic needle, sealing means sealingly securing said closure means to said storage vessel and defining an access opening overlying said resealable backing, said lining being made from material selected from the group consisting of chlorobutyl rubber and a polymer of tetrafluoroethylene, said lining and backing having a combined thickness between 60 and 100 mils.

References Cited by the Examiner

UNITED STATES PATENTS

| | | | |
|---|---|---|---|
| 2,393,578 | 6/46 | Waite | 215 |
| 2,698,272 | 12/54 | Clapp et al. | 215 |
| 2,728,475 | 12/55 | Teeters et al. | 215—40 |
| 3,092,278 | 6/63 | Jarnhall | 215—37 |

THERON E. CONDON, *Primary Examiner.*